(12) United States Patent
Ruda et al.

(10) Patent No.: US 7,561,346 B1
(45) Date of Patent: Jul. 14, 2009

(54) ANGULAR SHEAR PLATE

(75) Inventors: Mitchell C. Ruda, Tucson, AZ (US);
Alan W. Greynolds, Tucson, AZ (US);
Tilman W. Stuhlinger, Tucson, AZ (US)

(73) Assignee: Applied Energetics, Inc, Tucson, AZ (US)

( * ) Notice: Subject to any disclaimer, the term of this patent is extended or adjusted under 35 U.S.C. 154(b) by 239 days.

(21) Appl. No.: 11/622,919

(22) Filed: Jan. 12, 2007

(51) Int. Cl.
*G02B 17/00* (2006.01)
*G02B 13/18* (2006.01)

(52) U.S. Cl. .................. 359/732; 359/717; 359/718; 359/738

(58) Field of Classification Search .................. 359/676, 359/679, 683, 732, 738
See application file for complete search history.

(56) References Cited

U.S. PATENT DOCUMENTS

| | | | | |
|---|---|---|---|---|
| 3,822,932 A * | 7/1974 | Humphrey | .................. | 351/222 |
| 4,650,292 A * | 3/1987 | Baker et al. | .................. | 359/720 |
| 5,095,386 A * | 3/1992 | Scheibengraber | ........... | 359/668 |
| 6,987,621 B2 * | 1/2006 | Yoshihara | .................... | 359/649 |
| 2003/0137919 A1* | 7/2003 | Inui et al. | .............. | 369/112.24 |
| 2007/0146896 A1* | 6/2007 | Chiu | .......................... | 359/672 |
| 2007/0247725 A1* | 10/2007 | Dowski et al. | .............. | 359/676 |

* cited by examiner

*Primary Examiner*—Jordan M. Schwartz
(74) *Attorney, Agent, or Firm*—Duft Bornsen & Fishman LLP; Gregory T. Fettig

(57) ABSTRACT

One or more disc-shaped angular shear plates each include a region thereon having a thickness that varies with a nonlinear function. For the case of two such shear plates, they are positioned in a facing relationship and rotated relative to each other. Light passing through the variable thickness regions in the angular plates is refracted. By properly timing the relative rotation of the plates and by the use of an appropriate polynomial function for the thickness of the shear plate, light passing therethrough can be focused at variable positions.

20 Claims, 4 Drawing Sheets

ANGULAR SHEAR PLATE

GOVERNMENT RIGHTS

The U.S. Government has a paid-up license in this invention and the right in limited circumstances to require the patent owner to license others on reasonable terms as provided for by the terms of Contract No. DE-AC26-04NT42138 awarded by the U.S. Department of Energy.

BACKGROUND

A great number of optical systems require that the focal length of the optical system be variable so that the focus of the optical system can be changed. Often, the change in focal length is achieved by moving the optical elements toward or away from each other or the image plane. Linear movement of the optical elements or of the image plane is typically achieved by manual operation or through the use of motors.

Some optical elements require a very rapid change in focus, for example a focus change of one diopter in a fraction of a millisecond may be required. This rapid focus change is very difficult to achieve with linear motion due in part to the moment of inertia of the optical elements and/or the image plane. For example, typical mechanical systems of moving lenses may require hundreds of milliseconds to change the focus by one diopter.

One technique for changing focus is with the use of a pair of Alvarez plates, sometimes referred to as shear plates. A shear plate in this case is a transmissive plate having a flat, planar surface on one side thereof and a non-planar surface on an opposite side thereof that follows a polynomial function. In other words, the thickness of the plate varies with a polynomial function. These two shear plates are placed facing each other such that the surfaces following the polynomial function are opposed to each other. Furthermore, the facing surfaces are complementary to each other so that if the shear plates were to be brought into contact with each other, these surfaces would mate and opposite sides of the shear plates would be parallel to each other.

The shear plates are actually spaced apart from each other a sufficient distance such that they can be moved relative to each other in a direction that is orthogonal (transverse) to the optical axis (the primary axis along which light passes through the optical system). By moving the shear plates relative to each other, a change in focus can be achieved. Unfortunately, as with other approaches discussed above, the moment of inertia of the shear plates and mounting structures for moving the shear plates reduces the speed with which the shear plates can be moved relative to each other.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to one aspect of the invention, an optical system includes an optical element configured for rotary movement, the optical element having a planar surface and an opposite second surface that has at least one non-planar region, the thickness of the optical element varying in the non-planar region. The optical system also includes means for rotating the optical element.

An optical axis generally orthogonal to the optical element may pass through one of the non-planar regions at least during a portion of every rotation. The optical element may be disc-shaped. There may be a plurality of such non-planar regions on the optical element.

The system may further include a second optical element, the optical element having a planar surface and an opposite second surface that has at least one non-planar region, the thickness of the optical element varying in the non-planar region, where the non-planar region of the second optical element is complementary to the non-planar region of the first optical element and further wherein the optical elements are positioned so that the non-planar regions are opposed to each other during at least one point in the rotation of the first optical element. The system may further include means for rotating the second optical element so that an optical axis generally orthogonal to the optical element passes through one of the non-planar regions thereon at least during a portion of every rotation, where the first and second optical elements are rotated in opposite directions to each other. The optical elements may each be disc-shaped. There may be a plurality of such non-planar regions on each of the first and second optical elements. A nonlinear function may govern the thickness of each of the non-planar regions. A polynomial equation governing the thickness of each of the non-planar regions may be essentially cubic.

The system may further include a reflector that folds the optical axis to pass back through the optical element a second time, at a different location on the optical element. The different location on the optical element may be such that when the optical axis is passing through one of the at least one non-planar regions, the folded optical axis will pass through another one of the at least one non-planar regions. There may be an even number of such non-planar regions.

According to another aspect of the invention, an optical system includes a disc-shaped optical element having at least a portion thereof with a thickness that is not constant, where the optical element is adapted for rotary movement so that, when the optical element is being rotated, a series of pulses along a fixed optical axis will pass through different portions of the optical element having different thicknesses.

According to another aspect of the invention, an optical element includes a disc-shaped optical element having at least a portion thereof that refracts light differently than another portion of the optical element, where the optical element is adapted for rotary movement so that, when the optical element is being rotated, a series of pulses along a fixed optical axis will pass through different portions of the optical element having different thicknesses.

According to another aspect of the invention, an optical system includes an optical element configured for rotary movement, the optical element having a planar surface and an opposite second surface that has at least one non-planar region, the thickness of the optical element varying in the non-planar region. The optical system also includes a motor having a shaft that is rotated by the motor, the shaft being attached to the optical element to rotate the optical element with the shaft.

According to another aspect of the invention, an optical system includes a first optical element configured for rotary movement, the first optical element having a planar surface and an opposite second surface that has at least one non-planar region, the thickness of the first optical element varying in the non-planar region. The optical system also includes a second optical element configured for rotary movement, the second optical element having a planar surface and an opposite second surface that has at least one non-planar region, the thickness of the second optical element varying in the non-planar region. The optical system further includes means for creating relative rotational motion between the first and second optical elements.

An optical axis generally orthogonal to the first optical element may pass through one of the non-planar regions of the first optical element and one of the non-planar regions of the second optical elements at least during a portion of every rotation, where the non-planar region of the second optical element is complementary to the non-planar region of the first optical element and further wherein the optical elements are positioned so that the non-planar regions are opposed to each other during at least one point in the rotation of the first optical element.

According to another aspect of the invention, an optical system includes an optical element configured for rotary movement, the optical element having a planar surface and an opposite second surface that has at least two non-planar regions, the thickness of the optical element varying in the non-planar regions, wherein an optical axis generally orthogonal to the optical element passes through one of the non-planar regions at least during a portion of every rotation. The optical system also includes a reflector that folds the optical axis to pass back through the optical element a second time, at a different location on the optical element.

The optical system further includes means for rotating the optical element. The different location on the optical element may be such that when the optical axis is passing through one of the at least two non-planar regions, the folded optical axis will pass through another one of the at least two non-planar regions. There may be an even number of such non-planar regions.

According to another aspect of the invention, a method of varying focus in an optical system includes providing a pair of optical elements, each having a planar surface and an opposite second surface that has at least one non-planar region, the thickness of the first optical element varying in the non-planar region, and rotating at least one of the optical elements relative to the other.

According to another aspect of the invention, a method of varying focus in an optical system includes providing an optical element having a planar surface and an opposite second surface that has at least one non-planar region, the thickness of the first optical element varying in the non-planar region; rotating the optical element; and reflecting light passing through a portion of the optical element to pass through a different portion of the optical element.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION

Reference will now be made to the accompanying drawings, which assist in illustrating the various pertinent features of the present invention. Although the present invention will now be described primarily in conjunction with angular shear plates, it should be expressly understood that the present invention may be applicable to other applications where it is desired to vary a characteristic of an optical system with the use of shear plates. In this regard, the following description of an angular shear plate is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
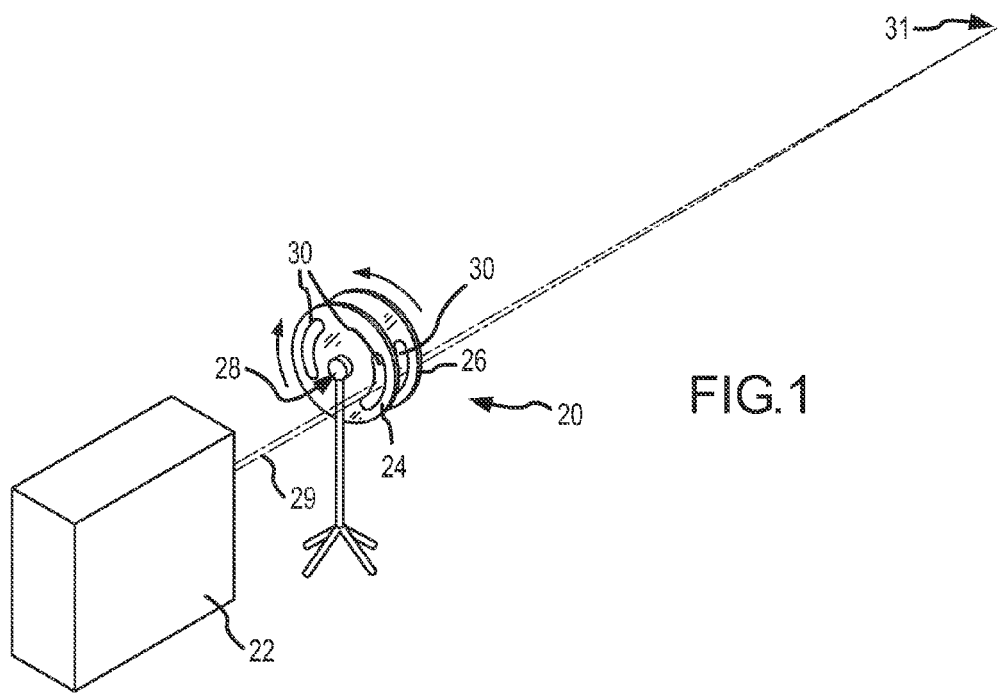
FIG. 1 is a perspective view of an optical system including a laser and a pair of angular shear plates.

An optical system 20 is shown in FIG. 1. The optical system 20 includes a light source 22, a pair of disk-shaped shear plates 24 and 26, and a means 28 for rotating the shear plates relative to each other. The light source 22 may be any of a variety of types of light sources, including lasers, LEDs, and other types of light sources. In the embodiment described herein, the light source 22 provides a beam 29 of collimated light. For example, although the light source may produce monochromatic or white light, collimated, diverging, or converging light, pulsed or continuous wave (CW) light, one application may include monochromatic, collimated, pulsed light. For example, the light source 22 could be a laser.

Figure 4:
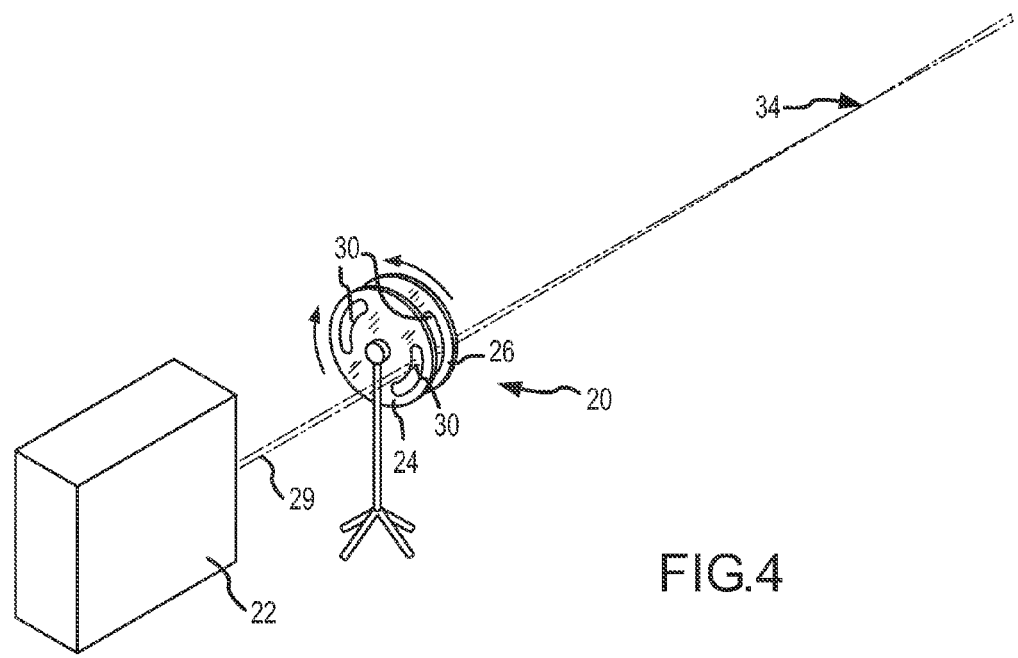
FIG. 4 is a perspective view similar to FIG. 1, showing the shear plates in a different relative rotational position.
Figure 5:
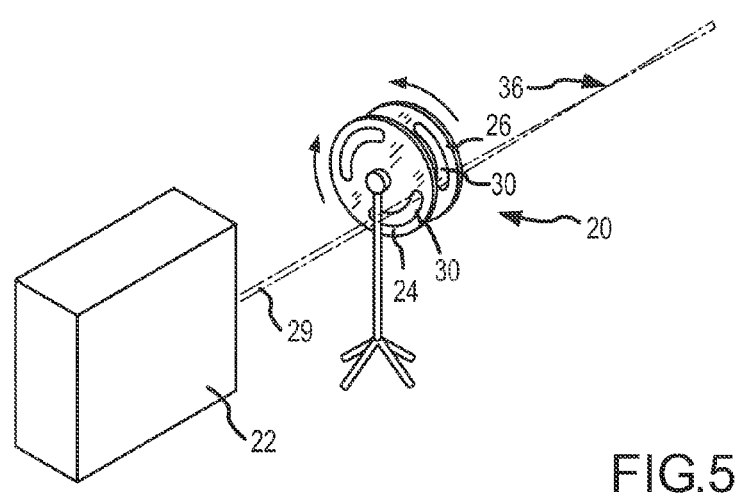
FIG. 5 is a perspective view similar to FIG. 1, showing the shear plates in a second, different relative rotational position.

Each of the shear plates 24 and 26 have non-planar regions 30 formed thereon. In this embodiment, the regions 30 on the respective shear plates 24 and 26 are similarly shaped but are complementary in nature such that the two plates could be brought into contact with each other and the regions would mate with each other. The refraction of light due to the relative position of the shear plates 24 and 26 in FIG. 1 causes the laser beam 29 to focus at a distant point 31. By moving the shear plates 24 and 26 to a new position relative to each other, different focal points for the optical system 20 can be achieved, such as is shown in FIGS. 4 and 5. The intersection of the beam 29 of collimated light with the non-planar region 30 on the shear plates 24 and 26 will be referred to herein as the beam spot.

Figure 3:
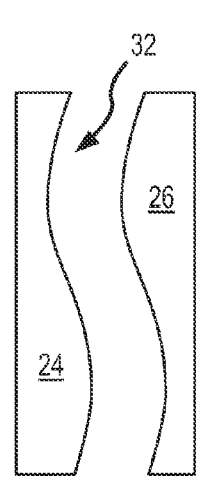
FIG. 3 is a close-up view of portions of a pair of angular shear plates, showing the region on each shear plate that has a non-constant thickness.
Figure 2:
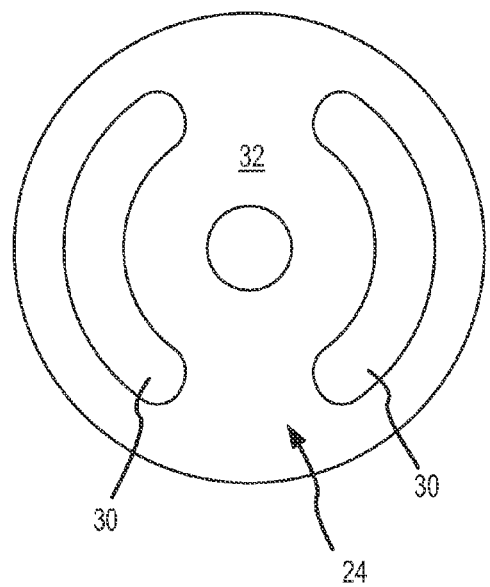
FIG. 2 is a side view of one of the shear plates of FIG. 1, showing a pair of regions thereon where the thickness of the plate is not constant.

One example of a material that may be used for the shear plates 24 and 26 is fused silica, although glass, plastic, ceramic, crystal, or any other suitable transparent material could be used. The shear plates 24 and 26 are shown in more detail in FIGS. 2 and 3. FIG. 2 shows a top view of one side 32 of the shear plate 24, in which the non-planar regions 30 appear as kidney-shaped regions. The remainder of the surface on the one side 32 of the shear plate 24 in FIG. 2 is generally planar. FIG. 3 shows a cross-sectional view of corresponding non-planar regions on the shear plates 24 and 26. In this case, it shows that the opposed non-planar surfaces of the shear plates are complementary to each other. The opposite sides on each of the shear plates 24 and 26 are substantially planar, and therefore are parallel to each other. Of course, the view shown in FIG. 3 shows only the non-planar portions on the facing sides of the shear plates 24 and 26 and does not show the planar portion on the facing sides. Although in this system 20, the shear plate 24 is shown to have two non-planar regions, the system could use shear plates with any number of non-planar regions. Also, the non-planar regions on the two plates may face each other, or they may each face away from each other, or one could face the opposite shear plate, while the non-planar regions on that opposite shear plate face away.

The precise shape of the non-planar regions of the shear plates 24 and 26 are governed by a nonlinear function, which may be a polynomial function. First, the polynomial function represents the thickness variation (relative to a nominal plate thickness) of the shear plate at a particular location. The nominal plate thickness must be sufficient to prevent a negative overall thickness, but is otherwise relatively unimportant. Because the shear plate is intended for rotational movement and is disc-shaped, the polynomial function is expressed in an $r, \theta$ coordinate system, representing the radial and angular position on the shear plate. An exemplary polynomial function is:

$$\sigma = a(3\rho\theta(r^2+\rho^2) - 6\rho^2 r \sin(\theta) - t\rho^3\theta)$$

where $\sigma$=thickness variation of shear plate at point $r, \theta$
a=focus coefficient
$r, \theta$=polar coordinates
$\rho$=radial coordinate of center of beam
t=tilt coefficient to minimize surface departure The derivation of this equation proceeds from the desired shear plate configuration in which two counter-rotating glass plates, figured to the desired surface profile, produce a wavefront with a quadratic dependence on the radial polar coordinate originating at the center of the wavefront. This wavefront should be decentered from the center of the glass plates since this center is needed for the rotation axis.

The derivation begins with the equation for the desired quadratic focus wavefront W in polar coordinates:

$$W = 3 \cdot (r^2+\rho^2) - 6 \cdot r \cdot \rho \cdot \cos(\theta), \quad (1)$$

where $r$ and $\theta$ are polar coordinates and $\rho$ is the radial decentration of the wavefront from the origin of the polar coordinate system. The factor of 3 by which this equation is multiplied is included for historical reasons.

It is desired that W changes as a function of the shear angle $\delta$ between the two shear plate. To include the shearing operation, the above equation (1) must be multiplied by $\rho \cdot \delta$, as follows:

$$W = 3 \cdot \rho \cdot \delta \cdot [r^2 + \rho^2 - 2 \cdot r \cdot \rho \cdot \cos(\theta)] \quad (2)$$

The shearing operation in effect takes the derivative, with respect to $\theta$, of the shear plate surface profile. This surface profile may thus be obtained by integrating the above equation (2) over $\theta$. The shear angle $\delta$ is not included in the integration since it is a result of the derivative of the surface figure.

This yields a thickness variation $\sigma$ given by $$\sigma = 3\rho \cdot [(r^2+\rho^2) \cdot -2 \cdot r \cdot \rho \cdot \sin(\theta)] \quad (3)$$

This thickness variation, by itself, is sufficient to provide the desired quadratic wavefront. In order to reduce the surface departure, and to therefore simplify fabrication, a tilt term is added to the above equation. In order to avoid changes to the quadratic-producing thickness variation, this tilt term may be a function only of the first power of the angular polar coordinate $\theta$, but not of the radial coordinate r. For dimensional consistency, the angular coordinate of the tilt term is multiplied by $\rho^3$. A coefficient t prescribes the proper amount of tilt needed to minimize the surface departure.

This tilt term is added to the above thickness variation equation (3). This is then multiplied by a surface coefficient a that describes the amplitude of the quadratic wavefront for a given shear angle $\delta$. The final thickness variation equation is then $$\sigma = 3 \cdot a \cdot \rho \cdot [(r^2+\rho^2) \cdot \theta - 2 \cdot r \cdot \rho \cdot \cos(\theta) - t \cdot \rho^3 \cdot \rho\theta] \quad (4)$$

The shearing operation is defined by the following. Here it is assumed that two shear plates are rotated relative to each other by equal and opposite shear angles $\delta$. Furthermore, the index of refraction n of the shear plate material is included so that the actual wavefront amplitude is obtained.

$$W = 1.5 \cdot (n-1) \cdot a \cdot \rho \cdot [(r^2+\rho^2-t\rho^2) \cdot [(\theta+\delta)-(\theta-\delta)] - 2 \cdot r \cdot \rho \cdot [\cos(\theta+\delta) - \cos(\theta-\delta)]] \quad (5)$$

Simplifying this equation yields finally $$W = 3 \cdot (n-1) \cdot a \cdot \rho \cdot [(r^2+\rho^2-t\rho^2) \cdot \delta - 2 \cdot r \cdot \rho \cdot \cos(\theta) \cdot \sin(\delta)] \quad (6)$$

This wavefront differs from the desired wavefront by the term $$C = 12 \cdot a \cdot (n-1) \cdot \rho^2 \cdot r \cos(\theta) \cdot [\delta - \sin(\delta)] \quad (7)$$

This describes a tilt term whose magnitude varies with the shear angle. Thus, the desired quadratic wavefront is obtained, but the beam direction changes slightly (i.e., the beam tilts) as a function of the shear angle. In the embodiment of the shear plate fabricated for this work, the maximum tilt angle is about 0.03°.

In an embodiment of the shear plates that was fabricated, the following parameters were used:
a=4.093·10$^{-6}$ mm$^{-2}$
p=43 mm
n=1.51078
$\delta$=23.6° (maximum).

Two shear plates with the surface figure described by these parameters and configured so that the non-smooth surfaces face each other will cause a collimated beam to be focused at a distance of 2.25 m at a shear angle of 23.6°. This focus distance moves to infinity as the shear angle approaches 0°.

It should be noted that the thickness variation equation is essentially a cubic equation since cubic-like behavior comes from the sin(θ) term. This is because the first two terms of the power series expansion for this term are $\theta - \theta^3/6 + \ldots$. Thus, it is as if there were a $\theta^3$ term in the equation. Preliminary testing reveals that reasonable results may be obtained from merely replacing sin(θ) with $\theta - \theta^3/6$.

It can be appreciated that the thickness in the non-planar region is primarily a function of the angular position, as opposed to the radial position. In addition, the tilt term is added to decrease the extent of the deviation between the minimum and maximum thickness of the plate in the non-planar region. For example, the depth change may be as little as 100 is microns, if such a tilt term is added. Furthermore, the rate of change of the thickness (slope) is decreased with the addition of the tilt term. Each of these lessened parameters may make the shear plates 24 and 26 easier and thus less expensive to manufacture. One example of a company that can manufacture such plates is OptiPro Systems Inc. of Ontario, N.Y.

Figure 7:
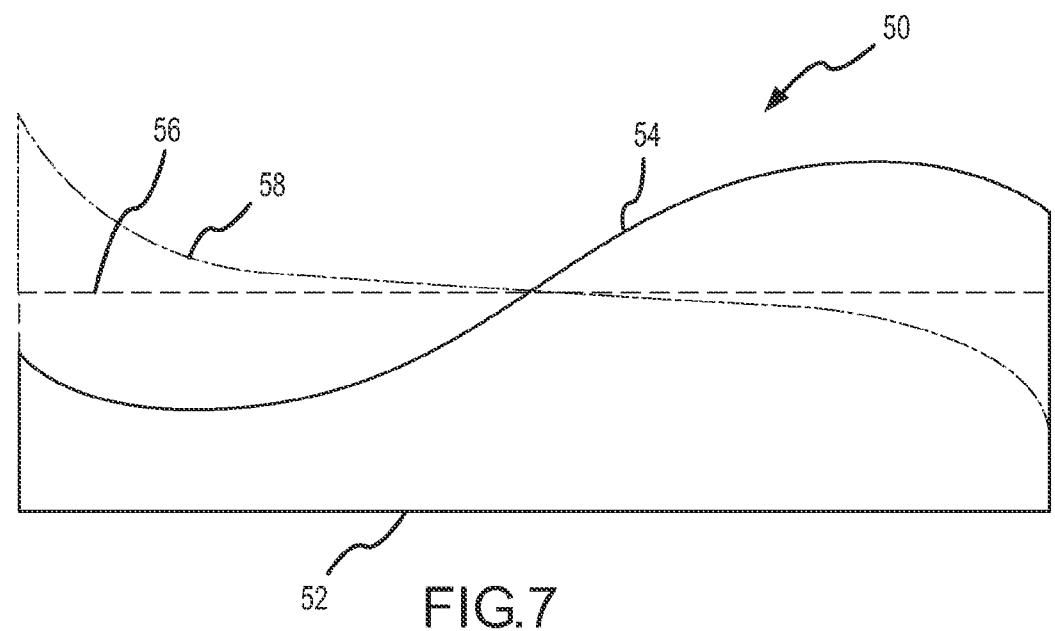
FIG. 7 is a cross-sectional view of a portion of the non-constant thickness region of the shear plate of FIG. 1, as compared to constant thickness shown in dashed lines, and as compared to a thickness that varies in relation to a polynomial function without a tilt term.

FIG. 7 shows a portion of an angular shear plate 50 with a planar surface 52 and a non-planar surface 54 such as is described herein. For comparison purposes, a planar surface 56 is shown in dashed lines. Also for comparison purposes, a non-planar surface 58 is shown in dotted lines, providing an example of how the surface might look without a tilt term.

The means 28 for rotating the shear plates 24 and 26 may be any sort of suitable apparatus that rotates the shear plates, such as a motor and drive shaft. In this embodiment, each of the shear plates 24 and 26 may have its own motor and drive shaft, with the drive shaft engaging with a suitable opening in the respective shear plate. The rotation means 28 rotates the shear plates 24 and 26 in opposite directions. The motor may include a high-speed motor that can rotate at a speed in the range of 10,000 rpm. Furthermore, the motor may include an encoded drive shaft so that the motor knows at all times the precise angular position of the drive shaft. Alternatively, each of the angular shear plates could have information encoded thereon so that an optical detector could sense the position of each of the shear plates. Further, electronics associated with the motor or with such an optical detector may provide a trigger signal that can be used to control the timing of the pulses of light from the light source. Phase-locking may be used to have the light pulses coincide with a particular angular position of the angular shear plates.

The motors that rotate the shear plates 24 and 26 may be controlled electronically by a controller or other electronic device to precisely control the rotational speed of each of the shear plates 24 and 26. In particular, it may be desirable to synchronize the rotation of the two shear plates 24 and 26 so that the absolute positions where the non-planar regions overlap is consistent for each rotation of the shear plates. This would allow the beam of light from the light source 22 to consistently impinge upon the shear plates 24 and 26 at a consistent location. For the case of pulsed light, the pulses could be spaced apart in time and in synchronization with the rotation of the angular shear plates 24 and 26 such that each pulse impinges upon the shear plates 24 and 26 at the same relative location each time. Alternatively, the pulses could be spaced apart in time and in synchronization with the rotation of the angular shear plates 24 and 26 such that each of a series of pulses passes through a different position of the non-planar regions on the two angular shear plates 24 and 26. This is demonstrated in FIGS. 4 and 5, which show the angular shear plates 24 and 26 at different rotational positions than in FIG. 1, resulting in focal points at 34 and 36, respectively. Further, the time duration of each pulse may be so short that the rotating shear plates 24 and 26 are essentially stationary as the pulses pass therethrough. One scenario may include a series of pulses separated in time by relatively short time periods and then a relatively-longer gap in time until a subsequent series of pulses. For example, the series of pulses may all occur during the time period that one non-planar region on one shear plate is passing by a non-planar region on the other shear plate. The gap in time may correspond to the time period until those same two non-planar regions are passing by each other at some subsequent time.

There are many variables that can be traded off against each other to achieve the desired performance. Many of these variables have a positive effect on one performance parameter and a neutral or negative effect on another performance parameter. For example, increasing the diameter of the shear plate may have a positive effect on the beam quality (which is a parameter related to how small of a spot to which the system could focus the pulse), while requiring higher RPM (which is generally believed to be a negative effect). Increasing the diameter of the light beam incident on the shear plate may have a negative effect on the beam quality, but a positive effect on the required rotational rate by allowing for a decrease in RPM. A third performance parameter, the required surface slope of the non-planar region is increased (generally believed to be a negative effect). Increasing the spatial separation between the two shear plates may have a negative effect on beam quality and may have no effect on the required rotational rate or surface slope. Similarly, increasing the angle between the two plates (the angle expressing the amount by which the two plates differ from being in parallel position) may have a negative effect on beam quality and may have no effect on the required rotational rate or surface slope. Increasing the number of non-planar shear regions on each shear plate may have a negative effect on beam quality and a positive effect on (a reduction of the) required rotational rate. Increasing the minimum focus distance required from the pair of shear plates may have a positive effect on beam quality, no effect on the required rotational rate, and a positive effect on the surface slope by decreasing same. Increasing the index of refraction of the shear plates may have a slight positive effect on the beam quality, no effect on the required rotational rate, and a positive effect on the surface slope. Increasing the size of the non-planar region may have a positive effect on the beam quality, a negative effect on the required rotational rate, and a positive effect on the surface slope. Increasing the length of the optical path between the shear plates may have a negative effect on beam quality, and no effect on required rotational rate.

Figure 6:
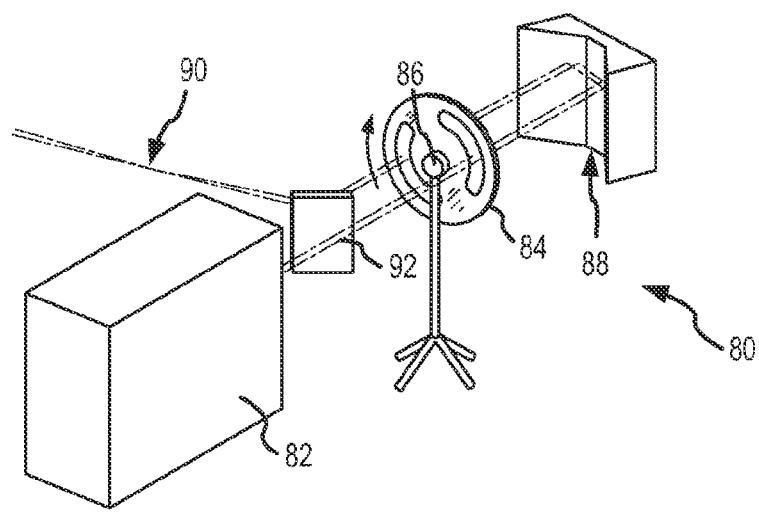
FIG. 6 is a perspective view of a second embodiment an optical system including a laser, an angular shear plate, and a roof reflector to reflect light for a second pass back through the shear plate at a different location.

As an alternative, an optical system 80 such as shown in FIG. 6 may be used. This system 80 includes a light source 82, a shear plate 84, a means 86 for rotating the shear plate, and a roof mirror 88. The light source 82 and means 86 for rotating the shear plate may be similar to the system 20 described above. The beam of light from the light source 82 is directed through the shear plate 84 where it impinges upon the roof mirror 88 and is reflected back through the shear plate 84 a second time. The shear plate 84 includes a plurality of non-planar regions having a polynomial function formed thereon as is described above with the shear plates 24 and 26. The number of non-planar regions on the shear plate 84 is even so that the beam of light can pass through a first non-planar region and then through a similarly-shaped non-planar region that may be spaced 180 degrees apart from the first non-planar region on the shear plate 84. By passing through these two non-planar regions the light can be focused at focal point 90. If desired, one or more folding mirrors 92 can be employed to direct the light in any desired direction.

The roof mirror 88 is conventional, having a pair of specularly-reflective surfaces oriented at a 45 degree angle to the optical path to create a 180 degree re-direction of the optical path at a laterally offset point. As is well known, the roof mirror 88 is so named because of its arrangement of reflective surfaces. In this case, the lateral offset is equal to the radial spacing between the two non-planar regions. Of course, there could be some greater, even number of non-planar regions, such as 4, 6, 8, and so forth. With a single shear plate system, there is of course no need to synchronize the rotation of two different angular shear plates.

Although the optical systems 20 and 80 have been described herein as including a light source that is controllably focused by angular shear plates, the controllable focus using angular shear plates could also be applied to imaging applications, or other applications in which a light receiving arrangement or detector was used instead of a light source. Further, the invention is equally applicable to other types of shear plates that can be rotated angularly, without regard to the number of non-planar regions thereon, the particular polynomial governing the non-planar regions, the particular position and size of the non-planar regions, and so forth.

Figure 8:
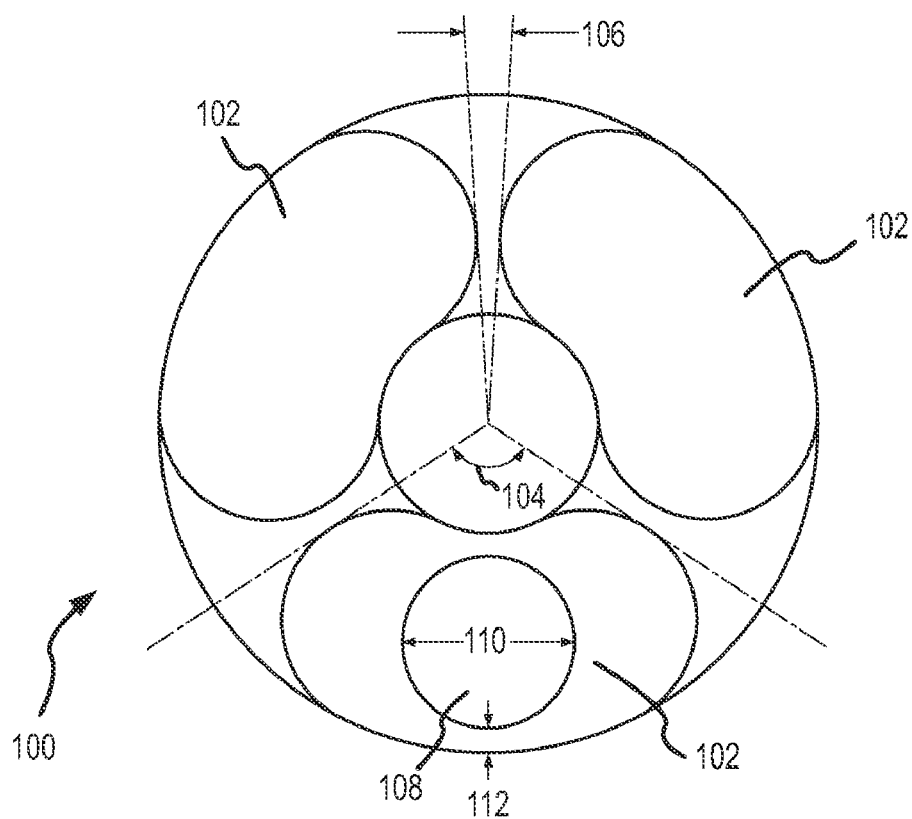
FIG. 8 is a side view of another embodiment of an angular shear plate.

One example of another shear plate 100 is shown in FIG. 8. The shear plate 100 includes three non-planar regions 102 that each have a thickness that varies with a polynomial function. Each region 102 has a size that can be expressed as the angular extent 104 across which the region extends. Each region is separated by an angle 106. A beam of light creates a beam spot 108 on one of the regions 102. The beam spot has a spot (or beam) diameter 110. The extent by which the region 102 extends radially beyond the beam spot 108 is the excess shear region size 112.

By having a non-zero alignment angle between the two angular shear plates, the light passing therethrough is redirected at an angle that is a function of the alignment angle between the shear plates. While in some systems/applications it may be desirable to minimize this alignment angle, in other systems/applications it may be desirable to maintain a non-zero alignment angle and/or control or vary this angle to direct light passing therethrough in a controllable fashion.

There are numerous advantages of the present invention. One is that focus can be changed rapidly without changing the moment of inertia of the optical system. As can be appreciated there are different advantages to the two shear plate system 20 and the one shear plate system 80. The two-plate system 20 may provide several performance advantages at additional cost for the second shear plate and with additional engineering and supply costs for controlling the rotational speed and phase of the two disks relative to each other.

One potential application of the optical systems described herein may involve a high-powered pulsed infrared laser as the light source and angular shear plates as disclosed herein to ionize the air at selected locations and cause a flash of visible light from the localized plasma caused by focusing the laser pulse at a fixed distance. Such a concept is discussed at www.newscientisttech.com/channel/tech/dn8778.html. In this article, the laser pulses are controlled in two dimensions by galvanometric mirrors with the third dimension being controlled by operation of a high-speed linear motor to move a lens and control the focal point of the laser pulse. With the use of the angular shear plates of the present patent application, the third dimension could be controlled in this manner to vary the focal point.

It is believed that any technique used with linear shear (Alvarez) plates can be applied to angular plates including the number of plates, straddling of plates, Petzval plates, and so forth.

The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. An optical system, comprising:
   an optical element configured for rotary movement, the optical element having a planar surface and an opposite second surface that has at least one non-planar region, the thickness of the optical element varying in the non-planar region;
   means for rotating the optical element, wherein an optical axis generally orthogonal to the optical element passes through one of the non-planar regions at least during a portion of every rotation; and
   a reflector that folds the optical axis to pass back through the optical element a second time, at a different location on the optical element.

2. An optical system as defined in claim 1, further including a second optical element, the second optical element having a planar surface and an opposite second surface that has at least one non-planar region, the thickness of the second optical element varying in the non-planar region;
   wherein the non-planar region of the second optical element is complementary to the non-planar region of the first optical element and further wherein the optical elements are positioned so that the non-planar regions are opposed to each other during at least one point in the rotation of the first optical element.

3. An optical system as defined in claim 2, further including means for rotating the second optical element so that an optical axis generally orthogonal to the second optical element passes through one of the non-planar regions thereon at least during a portion of every rotation;
   wherein the first and second optical elements are rotated in opposite directions to each other.

4. An optical system as defined in claim 3, wherein the optical elements are each disc-shaped.

5. An optical system as defined in claim 4, wherein there is a plurality of such non-planar regions on each of the first and second optical elements.

6. An optical system as defined in claim 5, wherein a polynomial function governs the thickness of each of the non-planar regions and is essentially cubic.

7. An optical system as defined in claim 1, wherein the optical element is disc-shaped.

8. An optical system as defined in claim 1, wherein there is a plurality of such non-planar regions on the optical element.

9. An optical system as defined in claim 1, wherein a polynomial governs the thickness of the non-planar region and is essentially cubic.

10. An optical system as defined in claim 1, wherein said at least one non-planar region comprises at least two planar regions, wherein the different location on the optical element is such that when the optical axis is passing through a first one of the at least two non-planar regions, the folded optical axis will pass through a second one of the at least two non-planar regions.

11. An optical system as defined in claim 10, wherein there is an even number of such non-planar regions.

12. An optical system as defined in claim 10, wherein the optical element is disc-shaped.

13. An optical system as defined in claim 10, wherein a polynomial function governs the thickness of each of the non-planar regions and is essentially cubic.

14. An optical system as defined in claim 1, wherein a nonlinear function governs the thickness of each of the non-planar regions.

15. An optical system, comprising:
- an optical element configured for rotary movement, the optical element having a planar surface and an opposite second surface that has at least one non-planar region, the thickness of the optical element varying in the non-planar region; and
- a motor having a shaft that is rotated by the motor, the shaft being attached to the optical element to rotate the optical element with the shaft, wherein an optical axis generally orthogonal to the optical element passes through said at least one non-planar region at least during a portion of every rotation; and
- a reflector that folds the optical axis to pass back through the optical element a second time, at a different location on the optical element.

16. An optical system, comprising:
- a first optical element configured for rotary movement, the first optical element having a planar surface and an opposite second surface that has at least one non-planar region, the thickness of the first optical element varying in the non-planar region;
- a second optical element configured for rotary movement, the second optical element having a planar surface and an opposite second surface that has at least one non-planar region, the thickness of the second optical element varying in the non-planar region; and
- means for creating relative rotational motion between the first and second optical elements, wherein an optical axis generally orthogonal to the first optical element passes through one of the non-planar regions at least during a portion of every rotation; and
- a reflector that folds the optical axis to pass back through the first optical element a second time, at a different location on the first optical element.

17. An optical system as defined in claim 16, wherein an optical axis generally orthogonal to the first optical element passes through one of the non-planar regions of the first optical element and one of the non-planar regions of the second optical element at least during a portion of every rotation;
- wherein the non-planar region of the second optical element is complementary to the non-planar region of the first optical element and further wherein the optical elements are positioned so that the non-planar regions are opposed to each other during at least one point in the rotation of the first optical element.

18. An optical system, comprising:
- an optical element configured for rotary movement, the optical element having a planar surface and an opposite second surface that has at least two non-planar regions, the thickness of the optical element varying in the non-planar regions, wherein an optical axis generally orthogonal to the optical element passes through one of the non-planar regions at least during a portion of every rotation;
- a reflector that folds the optical axis to pass back through the optical element a second time, at a different location on the optical element; and
- means for rotating the optical element.

19. An optical system as defined in claim 18, wherein the different location on the optical element is such that when the optical axis is passing through one of the at least two non-planar regions, the folded optical axis will pass through another one of the at least two non-planar regions.

20. An optical system as defined in claim 18, wherein there are an even number of such non-planar regions.

* * * * *